US010341461B2

(12) United States Patent
Moon et al.

(10) Patent No.: US 10,341,461 B2
(45) Date of Patent: Jul. 2, 2019

(54) SYSTEM AND METHOD FOR AUTOMATICALLY RECREATING PERSONAL MEDIA THROUGH FUSION OF MULTIMODAL FEATURES

(71) Applicants:Electronics and Telecommunications Research Institute, Daejeon (KR); SOGANG UNIVERSITY RESEARCH FOUNDATION, Seoul (KR); DIQUEST INC., Seoul (KR); Soongsil University Research Consortium techno-PARK, Seoul (KR); Pukyong National University Industry-University Cooperation Foundation, Busan (KR)

(72) Inventors: Kyeong Deok Moon, Daejeon (KR); Jong Ho Nang, Seoul (KR); Yun Kyung Park, Daejeon (KR); Kyung Sun Kim, Hwaseong-si (KR); Chae Kyu Kim, Daejeon (KR); Ki Ryong Kwon, Busan (KR); Kyoung Ju Noh, Daejeon (KR); Young Tack Park, Seoul (KR); Kwang Il Lee, Daejeon (KR)

(73) Assignees: Electronics and Telecommunications Research Institute, Daejeon (KR); SOGANG UNIVERSITY RESEARCH FOUNDATION, Seoul (KR); DIQUEST INC., Seoul (KR); Soongsil University Research Consortium techno-PARK, Seoul (KR); Pukyong National University Industry-University Cooperation Foundation, Busan (KR)

( * ) Notice: Subject to any disclaimer, the term of this patent is extended or adjusted under 35 U.S.C. 154(b) by 169 days.

(21) Appl. No.: 15/194,013

(22) Filed: Jun. 27, 2016

(65) Prior Publication Data

US 2017/0201562 A1 Jul. 13, 2017

(30) Foreign Application Priority Data

Jan. 12, 2016 (KR) ........................ 10-2016-0003779

(51) Int. Cl.
*G06F 15/16* (2006.01)
*H04L 29/08* (2006.01)
(Continued)

(52) U.S. Cl.
CPC .......... *H04L 67/306* (2013.01); *G06F 16/435* (2019.01); *G06F 16/9535* (2019.01); *G06F 17/2785* (2013.01)

(58) Field of Classification Search
CPC .............................. H04L 67/306; G06F 17/20
See application file for complete search history.

(56) References Cited

U.S. PATENT DOCUMENTS 7,925,721 B2    4/2011  Ro et al.
2010/0235307 A1*  9/2010  Sweeney ................. G06N 5/02
                                                     706/12
(Continued)

FOREIGN PATENT DOCUMENTS

KR    10-2009-0095330 A    9/2009
KR       10-1273646 B1     6/2013

*Primary Examiner* — Hua Fan
(74) *Attorney, Agent, or Firm* — William Park & Associates Ltd.

(57) ABSTRACT

Provided are a system and method for automatically recreating personal media through fusion of multimodal features. The system includes a multimodal fusion analyzer configured to analyze semantics of personal media having various forms based on a plurality of modalities and divide the personal media into media fragments which are the smallest units having semantics, a semantic-based intelligent (Continued)

retriever configured to store and retrieve the divided media fragments by considering the semantics, a personal media recommender configured to learn and analyze a profile of a user through modeling the user, and select and recommend a plurality of media fragments wanted by the user among the media fragments retrieved by the semantic-based intelligent retriever, and a personal media creator configured to create new personal media using the plurality of media fragments recommended by the personal media recommender according to a scenario input by the user.

18 Claims, 13 Drawing Sheets

(51) Int. Cl.
  *G06F 17/27* (2006.01)
  *G06F 16/435* (2019.01)
  *G06F 16/9535* (2019.01)

(56) References Cited

U.S. PATENT DOCUMENTS

| | | |
|---|---|---|
| 2012/0144408 A1 | 6/2012 | Kim et al. |
| 2013/0110838 A1 | 5/2013 | Lidy et al. |

* cited by examiner

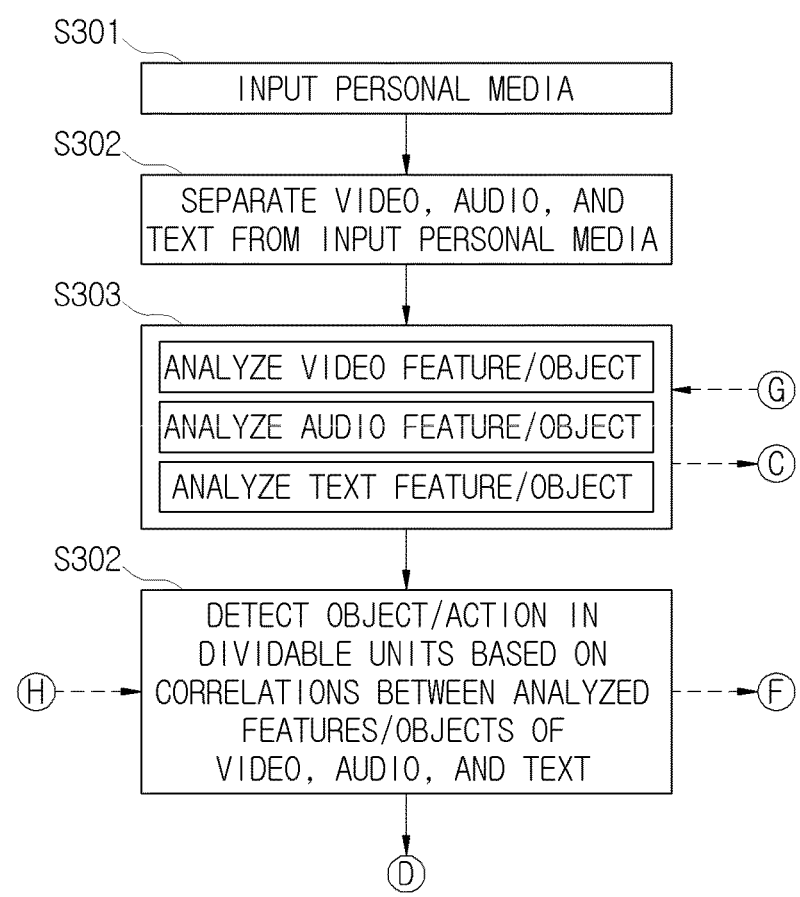

SYSTEM AND METHOD FOR AUTOMATICALLY RECREATING PERSONAL MEDIA THROUGH FUSION OF MULTIMODAL FEATURES

CROSS-REFERENCE TO RELATED APPLICATION

This application claims priority to and the benefit of Korean Patent Application No. 10-2016-0003779, filed on Jan. 12, 2016, the disclosure of which is incorporated herein by reference in its entirety.

BACKGROUND

1. Field of the Invention

The present invention relates to personal media technology, and more particularly, to a system and method for automatically recreating personal media through fusion of multimodal features.

2. Discussion of Related Art

These days, with the rapid proliferation of smart phones having hybridity, versatility, and portability, capturing a photo or video is becoming a part of daily life. According to such a trend, an information type is evolving from text into video, and a media type is evolving from mass media into personal media.

In particular, with the big bang of mobiles and media and proliferation of consumers' autonomous participation in information production to information consumption, video information which is visual and aural is rapidly increasing and diversifying. Accordingly, semantics of media information, such as video, is compressed as a feature which is easily combined and modified according to a user while quality of the media information is maintained. In this way, media information is recreated as customized knowledge which has ample power of information delivery, and thus is beginning to attract attention as a new repository capable of creating infinite value.

However, as for a level of utilizing media information, media are used as information goods which simply transfer messages while sharing videos or images, like one-time consumer goods. In other words, media information itself shows limitations on infinite value creation. Therefore, to recreate previously generated media as information goods having an infinite value, it is necessary to combine only necessary scenes of several media and create new media for delivering new semantics without an additional generation process. To this end, a system is required to create new media by grasping content of media stored therein, dividing and storing the media in units of scenes which are easily recycled, extracting scenes wanted by a user, and combining the extracted scenes in a desired sequence.

However, to recycle captured video or photos and create new media, a whole process of analyzing and dividing content of various videos and combining the divided videos into a desired form is carried out as a manual task involving a person. For example, currently, a user extracts necessary parts while viewing media from beginning to end, rearranges the extracted parts in a sequence wanted by the user, and combines additionally necessary effects, text, background music (BGM), etc. with new media. Since all tasks are manually carried out in this way, media recycling and media creation are limited to experts, and the infinite value of media is not being created.

Consequently, to overcome such a limitation, a system is required to minimize a person's involvement and take the lead in processing tasks, each of which is mainly processed by a person in currently provided media processing software.

SUMMARY OF THE INVENTION

The present invention is directed to providing a system and method for automatically recreating personal media which divide personal media into a plurality of media fragments through fusion of multimodal features, and recycle and combine some of the plurality of media fragments according to a scenario input from the outside of the system to recreate new personal media.

According to an aspect of the present invention, there is provided a system for automatically recreating personal media through fusion of multimodal features, the system including: a multimodal fusion analyzer configured to analyze semantics of personal media having various forms based on a plurality of modalities, and divide the personal media into media fragments which are smallest units having semantics; a semantic-based intelligent retriever configured to store and retrieve the divided media fragments by considering the semantics; a personal media recommender configured to learn and analyze a profile of a user through modeling the user, and select and recommend a plurality of media fragments wanted by the user among the media fragments retrieved by the semantic-based intelligent retriever; and a personal media creator configured to create new personal media using the plurality of media fragments recommended by the personal media recommender according to a scenario input by the user.

The multimodal fusion analyzer may separate at least one modality among a voice, a sound, text, and a video image from the personal media and analyze a feature.

The multimodal fusion analyzer may detect a dividable object and action based on a correlation between the separated modality and a modality of previously learned training data, and divide the dividable object and action into the media fragments which are physical units.

For efficient management of the media fragments, the semantic-based intelligent retriever may generate metadata indexes by considering the semantics of the divided media fragments and store the generated metadata indexes based on the semantics.

The semantic-based intelligent retriever may interpret the scenario to extract a keyword for retrieval and generate a query, and expand a retrieval range using at least one of the keyword, an associated keyword related to the keyword, and associated media related to the keyword to intelligently retrieve media fragments for the scenario.

The personal media recommender may select some of the retrieved media fragments based on a pre-stored preference model.

The personal media creator may interpret the scenario to make a sequence for playback, and dispose and play the selected media fragments.

The personal media creator may convert formats of the selected media fragments into an identical format when the formats of the selected media fragments are not identical.

The personal media creator may perform an optimization operation of adjusting a playback time length of the new personal media according to a playback time length wanted by the user, or an optimization operation of adjusting artificiality which may be caused at interfaces between the selected media fragments for natural and seamless playback.

According to another aspect of the present invention, there is provided a method of automatically recreating personal media through fusion of multimodal features, the method including: analyzing semantics of personal media having various forms based on a plurality of modalities, and dividing the personal media into media fragments which are smallest units having semantics; storing and retrieving the divided media fragments by considering the semantics; learning and analyzing a profile of a user through modeling the user, and selecting and recommending a plurality of media fragments wanted by the user among the retrieved media fragments according to a scenario input by the user; and creating new personal media using the plurality of recommended media fragments.

The dividing of the personal media may include separating at least one modality among a voice, a sound, text, and a video image from the personal media and analyzing a feature.

The dividing of the personal media may include detecting a dividable object and action based on a correlation between the separated modality and a modality of previously learned training data, and dividing the dividable object and action into the media fragments which are physical units.

For efficient management of the media fragments, the retrieving of the divided media fragments may include generating metadata indexes by considering the semantics of the divided media fragments and storing the generated metadata indexes based on the semantics.

The retrieving of the divided media fragments may include interpreting the scenario to extract a keyword for retrieval and generate a query, and expanding a retrieval range using at least one of the keyword, an associated keyword related to the keyword, and associated media related to the keyword to intelligently retrieve media fragments for the scenario.

The selecting and recommending of the plurality of media fragments may include selecting some of the retrieved media fragments based on a pre-stored preference model.

The creating of the new personal media may include interpreting the scenario to make a sequence for playback, and disposing and playing the selected media fragments.

The creating of the new personal media may include converting formats of the selected media fragments into an identical format when the formats of the selected media fragments are not identical.

The creating of the new personal media may include performing an optimization operation of adjusting a playback time length of the new personal media according to a playback time length wanted by the user, or an optimization operation of adjusting artificiality which may be caused at interfaces between the selected media fragments for natural and seamless playback.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3A, FIG. 3B and FIG. 3C are a flowchart illustrating a preprocessing operation of a system for automatically recreating personal media through fusion of multimodal features according to an exemplary embodiment of the present invention.

DETAILED DESCRIPTION OF EXEMPLARY EMBODIMENTS

Figure 1A:
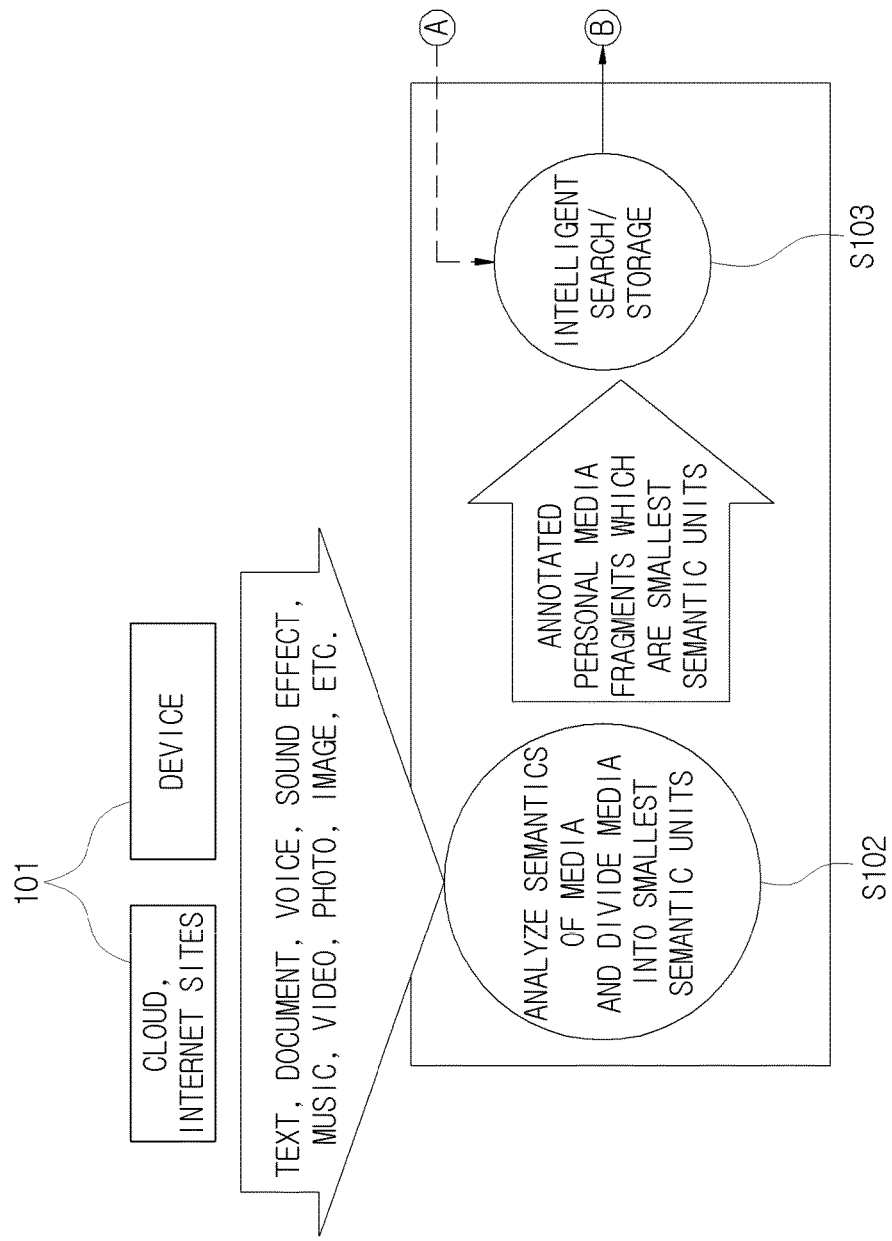
FIG. 1A and FIG. 1B are a conceptual diagram of a process for automatically recreating personal media through fusion of multimodal features according to an exemplary embodiment of the present invention.

Advantages and features of the present invention and a method of achieving the same will be more clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Meanwhile, the terminology used herein is for the purpose of describing the embodiments and is not intended to be limiting to the invention. As used in this specification, the singular form of a word includes the plural form unless the context clearly indicates otherwise. The term "comprise" and/or "comprising," when used herein, does not preclude the presence or addition of one or more components, steps, operations, and/or elements other than the stated components, steps, operations, and/or elements.

Hereinafter, exemplary embodiments of the present invention will be described in detail with reference to the accompanying drawings. Throughout the drawings, like reference numerals refer to like elements. In describing the present invention, any detailed description of a known technology or function will be omitted if it is deemed that such a description will unintentionally obscure the gist of the invention.

Figure 1B:
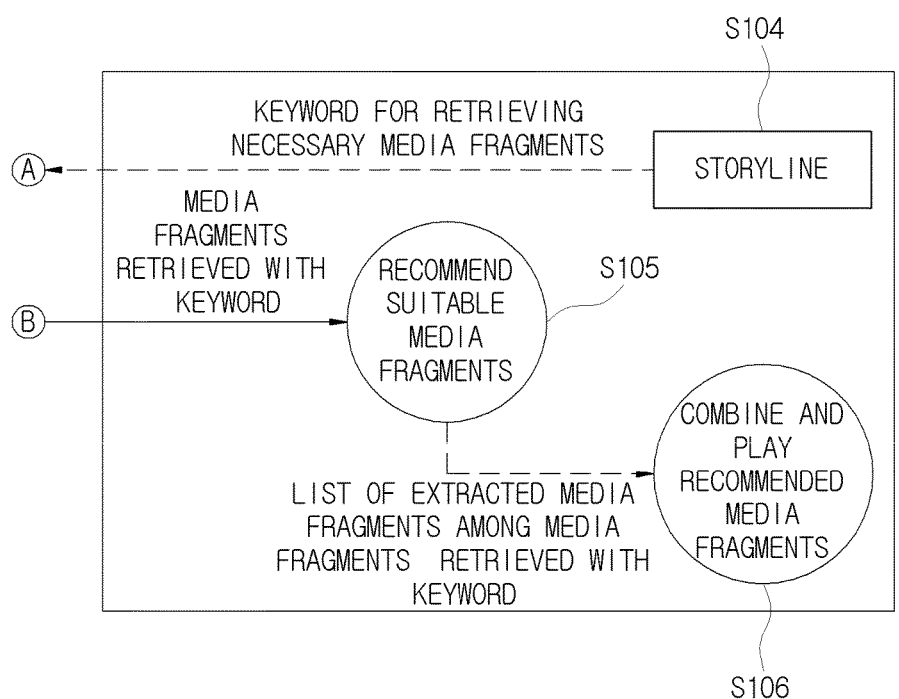

FIG. 1A and FIG. 1B are a conceptual diagram of a process for automatically recreating personal media through fusion of multimodal features according to an exemplary embodiment of the present invention.

As shown in FIG. 1 A and FIG. 1B, a process for automatically recreating personal media (referred to as the general term "automatic personal media recreation system" below) through fusion of multimodal features may be roughly divided into a preprocessing process and a postprocessing process.

First, the preprocessing process includes an operation of keeping and storing various personal media generated by individuals (S101), an operation of analyzing semantics of the stored personal media based on multimodal fusion and dividing the stored personal media into media fragments which are the smallest semantic units recyclable (S102), and then an operation of intelligently storing and retrieving the media fragments with consideration for the semantics of the divided media fragments (i.e., based on semantics) (S103).

The postprocessing process includes an operation of receiving a storyline written by a user (S104), an operation of recommending fragments with which the user will be satisfied among media fragments retrieved based on the received storyline according to preference (S105), and then an operation of combining the recommended media fragments in a sequence wanted by the user and playing the combined media fragments (S106).

A configuration and operation of an automatic personal media recreation system which performs an automatic personal media recreation process according to an exemplary embodiment of the present invention will be described in detail below with reference to FIG. 2A, FIG. 2B, FIG. 2C, FIG. 2D and FIG. 2E.

Figure 2A:
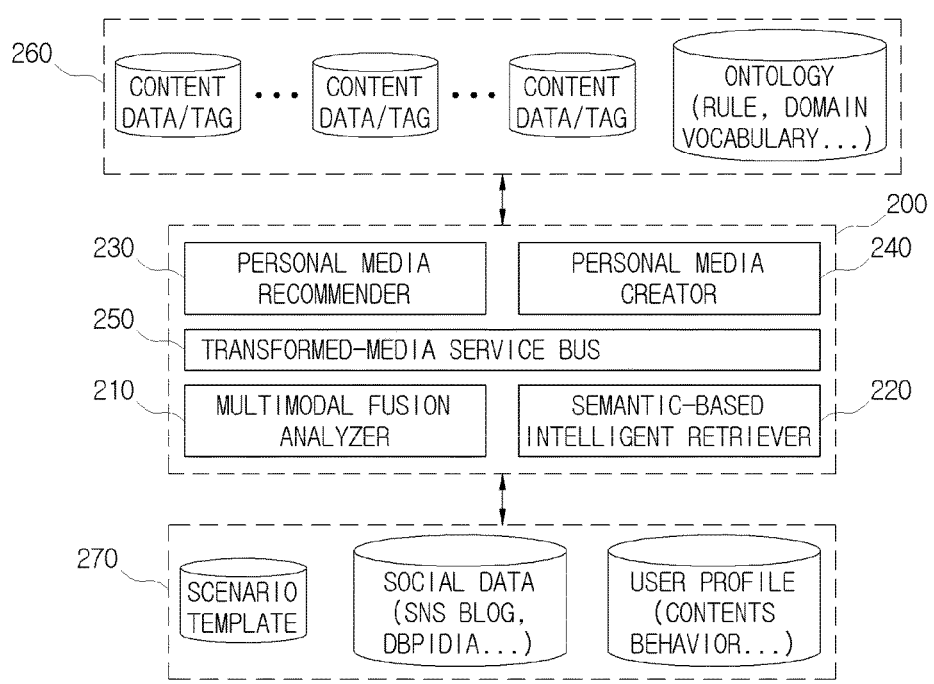
FIG. 2A is a configuration diagram of a system for automatically recreating personal media through fusion of multimodal features according to an exemplary embodiment of the present invention.

FIG. 2A is a configuration diagram of a system for automatically recreating personal media through fusion of multimodal features according to an exemplary embodiment of the present invention.

As shown in FIG. 2A, an automatic personal media recreation system 200 according to an exemplary embodiment of the present invention includes a multimodal fusion analyzer 210, a semantic-based intelligent retriever 220, a personal media recommender 230, and a personal media creator 240. All of the components (the multimodal fusion analyzer 210, the semantic-based intelligent retriever 220, the personal media recommender 230, and the personal media creator 240) constituting the automatic personal media recreation system 200 according to the exemplary embodiment of the present invention have structures for registering and managing services/modules (components) and operating in conjunction with each other through a transformed-media service bus 250, which transmits messages between the modules, to support services or modules to be newly developed later. Also, the automatic personal media recreation system 200 may include a first storage 260 for storing data or ontology (a semantic dictionary) information of media fragments required by each component, and a second storage 270 for storing data used for preference prediction and scenario data.

The multimodal fusion analyzer 210 performs an operation of improving the accuracy of analysis results of various personal media generated through cloud computing, Internet sites, photography devices, and so on. Here, the various personal media may be media of various forms, such as text, a voice, music, a sound effect, an image, a video, etc., generated by individuals and stored at a place that is easily accessible through a network by anyone.

Figure 2B:
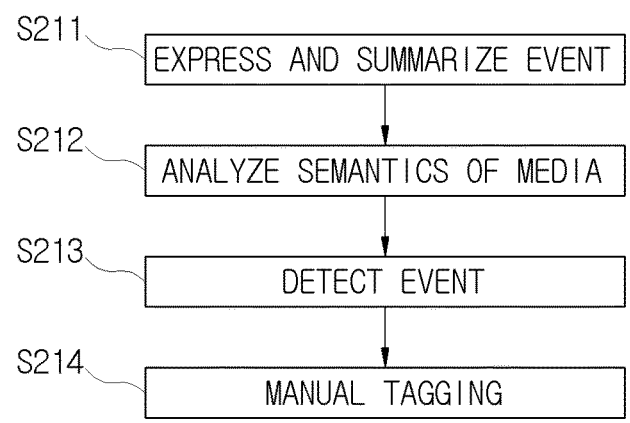
FIG. 2B, FIG. 2C, FIG. 2D and FIG. 2E are a flowchart illustrating a processing operation of a system for automatically recreating personal media through fusion of multimodal features according to an exemplary embodiment of the present invention.

Specifically, as shown in FIG. 2B, the multimodal fusion analyzer 210 defines a method of expressing and summarizing a feature of a modality constituting an arbitrary event (S211), and separates each modality constituting personal media to analyze a feature (semantics) (S212). For example, the multimodal fusion analyzer 210 may separate various modalities, such as a voice, a sound, text/a character, a video, an image, etc., and individually analyze features. Also, the multimodal fusion analyzer 210 multidimensionally analyzes correlations between the modalities using the analysis results, and detects and divides a dividable object and action (an event) into media fragments (S213). Further, when an incorrect or unanalyzed annotation for personal media is input by a user (or an expert), the multimodal fusion analyzer 210 manually tags and corrects the annotation (S214).

Figure 2C:
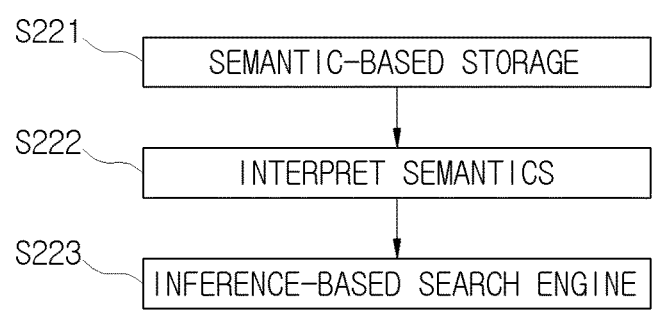

The semantic-based intelligent retriever 220 performs an operation of dividing media into the smallest units, storing the divided smallest units, and retrieving and providing the smallest units. Specifically, as shown in FIG. 2C, to efficiently manage the media fragments divided by the multimodal fusion analyzer 210, the semantic-based intelligent retriever 220 generates indexes by considering semantics and stores the indexes (S221). Subsequently, the semantic-based intelligent retriever 220 interprets (semantic interpretation) and processes a query for retrieving necessary personal media fragments (S222), and performs an intelligent search by expanding a retrieval range with a keyword, an associated keyword, or associated media (S223).

Figure 2D:
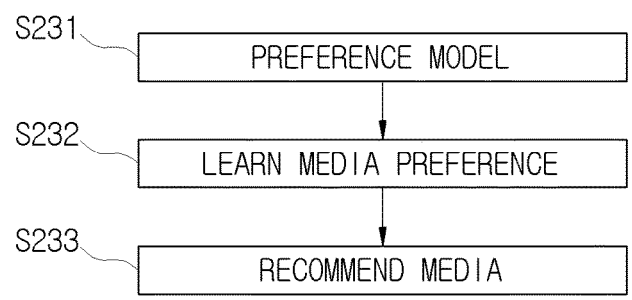

The personal media recommender 230 recommends media fragments suited for a storyline (a scenario) input by the user among the media fragments retrieved by the semantic-based intelligent retriever 220. Specifically, as shown in FIG. 2D, the personal media recommender 230 generates a preference model by considering relational features of media, a situation, space and time, an individual, social network service (SNS), etc. (S231), performs media preference learning by multidimensionally analyzing multiple association rules and association intensities through an analysis of correlations between preferences based on the generated preference model (S232), and fuses the user's feedback and different types of algorithms together to estimate results of the learning and recommend selected media fragments (S233).

Figure 2E:
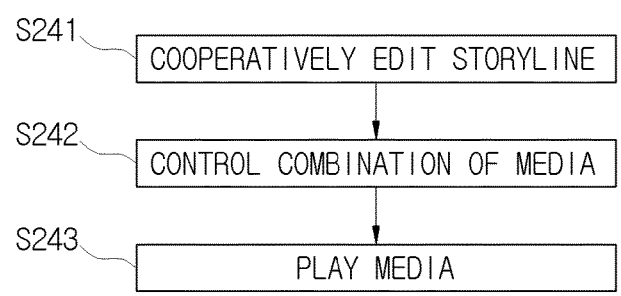

The personal media creator 240 performs a process for creating new media with the media fragments selected by the personal media recommender 230. Specifically, as shown in FIG. 2E, the personal media creator 240 generates a query for retrieval and a sequence for playback (cooperative storyline editing) by interpreting the storyline written by the user (S241), converts formats of the selected media fragments and combines the media fragments (S242), and plays the combined media fragments (S243). At this time, the user's usage pattern may be logged for later feedback.

An operational process of a system for automatically recreating personal media through fusion of multimodal features according to an exemplary embodiment of the present invention will be described in detail below with reference to FIGS. 3 and 4.

Figure 3B:
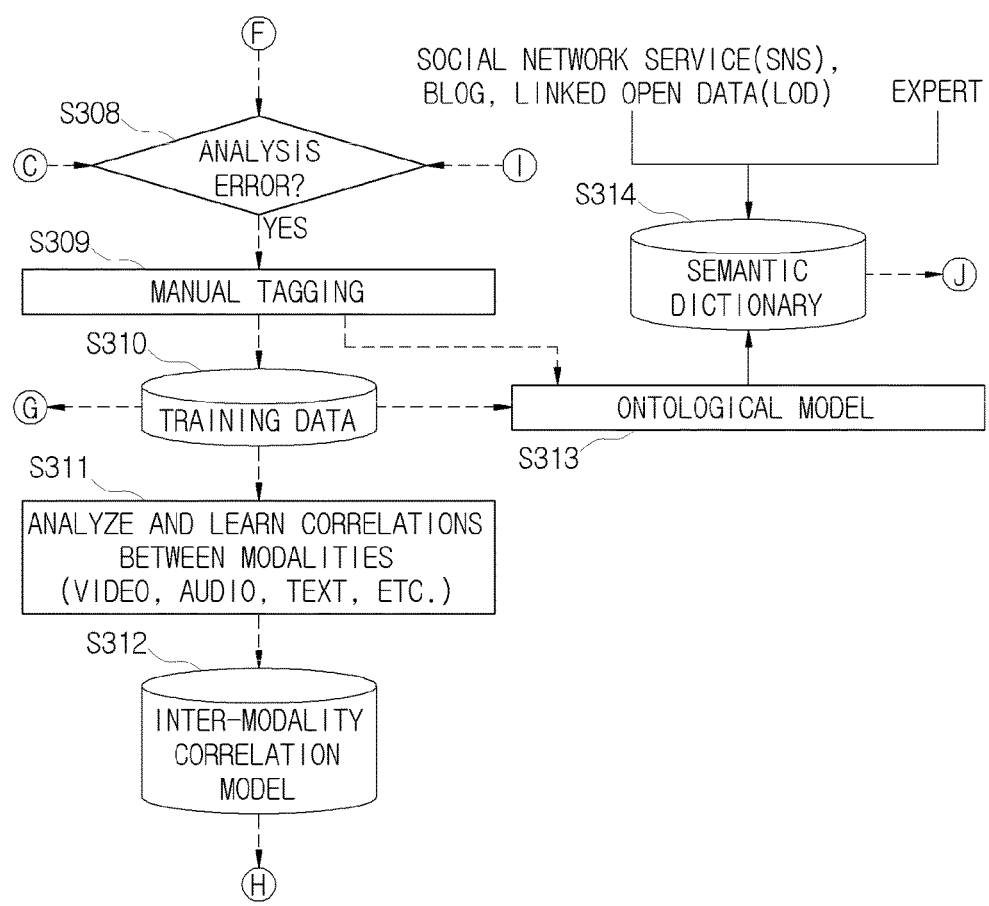
Figure 3C:
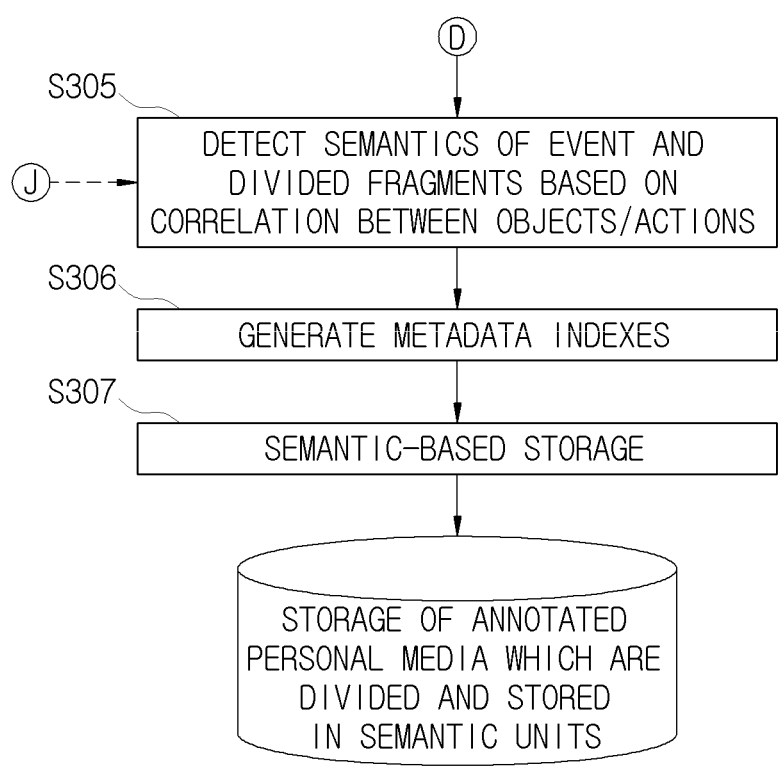
Figure 4A:
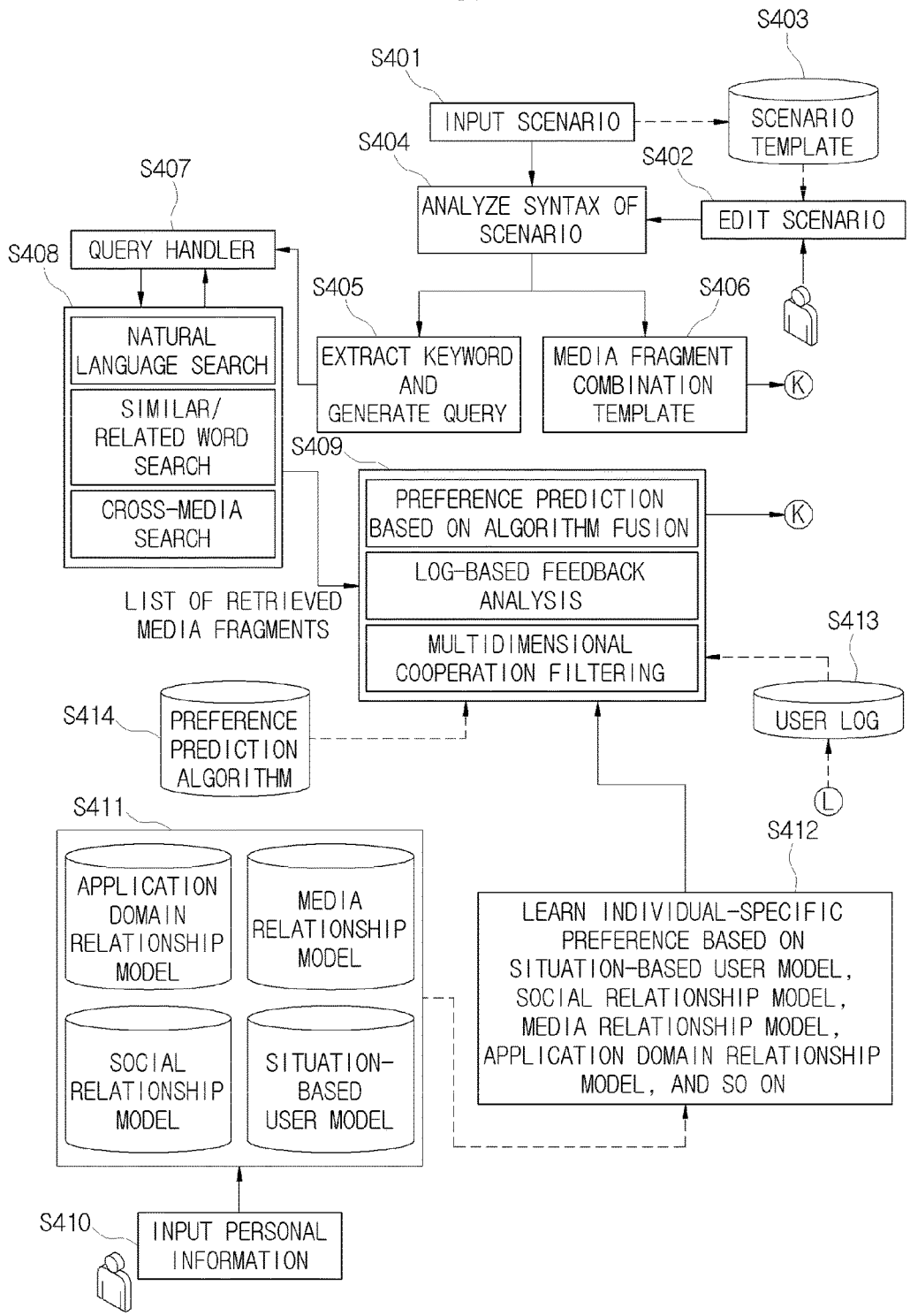
FIG. 4A and FIG. 4B are a flowchart illustrating a postprocessing operation of a system for automatically recreating personal media through fusion of multimodal features according to an exemplary embodiment of the present invention.
Figure 4B:
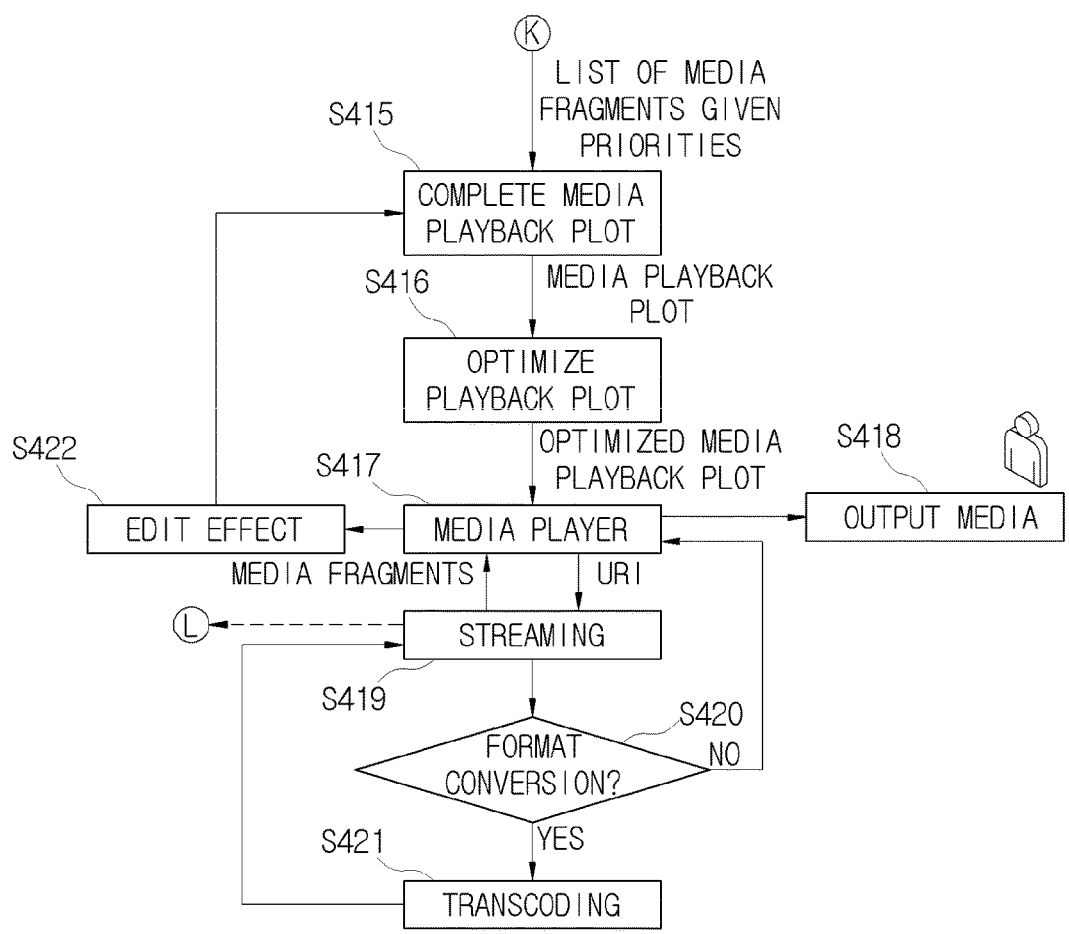

FIG. 3A, FIG. 3B and FIG. 3C are a flowchart illustrating a preprocessing operation of a system for automatically recreating personal media through fusion of multimodal features according to an exemplary embodiment of the present invention, and FIG. 4A and FIG. 4B are a flowchart illustrating a postprocessing operation of a system for automatically recreating personal media through fusion of multimodal features according to an exemplary embodiment of the present invention.

The automatic personal media recreation system 200 according to the exemplary embodiment of the present invention performs a preprocessing process (S301 to S314) of analyzing media to extract semantics, storing and managing media fragments according to semantics, and retrieving and providing media fragments according to a query, and a postprocessing process (S401 to S421) of receiving a recommendation of divided media fragments by considering semantics provided according to a user's request (a scenario) when the user writes a storyline (the scenario) to create desired media, determining priorities according to the user's preference, and extracting and dynamically combining media fragments to provide new personal media.

First, the preprocessing process of the automatic personal media recreation system 200 will be described with reference to FIG. 3A, FIG. 3B and FIG. 3C.

The automatic personal media recreation system 200 receives personal media from an external device (S301). Here, the personal media may be media of various forms, such as text, a voice, music, a sound effect, an image, a video, etc., generated by individuals and stored at a place that is easily accessible through a network by anyone.

The automatic personal media recreation system 200 separates individual modalities (a video, audio, text, etc.) constituting the various personal media input in operation S301 (S302), and extracts features of the personal media according to the modalities based on pre-learned features (S303). For example, the automatic personal media recreation system 200 analyzes features/objects of the video of the personal media, features/objects of the audio of the personal media, and features/objects of the text of the personal media.

Also, the automatic personal media recreation system 200 detects objects and actions in dividable units based on correlations between the analyzed features/objects of the video, the audio, and the text (modality) (S304). For example, the automatic personal media recreation system 200 detects objects and actions based on correlations between pre-learned modalities (training data, correlations between learned modalities, and inter-modality correlation models), and divides the personal media into media fragments which are physical units.

The automatic personal media recreation system 200 infers relationships between the objects and actions detected in operation S304 based on a pre-constructed semantic dictionary and ontology, divides the personal media into media fragments which are semantic units, and detects semantics of the divided media fragments (S305). Also, to efficiently manage the divided media fragments, the automatic personal media recreation system 200 generates metadata indexes of the media fragments (S306) and stores the metadata indexes based on the semantics (S307). In this way, the semantic based media fragments are given annotations and stored in a personal media storage divided into semantic units.

Meanwhile, when the media analysis results of operation S303 or operation S304 are not accurate (S308), the automatic personal media recreation system 200 manually annotates the media (S309), and stores the annotated media as data for training (S310). Also, the automatic personal media recreation system 200 analyzes and learns correlations between modalities (a video, audio, text, etc.) of training data (S311), and generates an inter-modality correlation model (S312).

In this way, the automatic personal media recreation system 200 has a structure in which manually corrected information of media fragments is stored as learning data and thus a recognizable range may continuously extend. A process for constructing training data will be described in detail below.

Technology for analyzing media and giving suitable semantics to the media like a person has been continuously researched for decades. Unlike data that people have encountered thus far, media has no standardized form, and objects constituting media have various types, such as a person, an animal, a background, and so on. Also, the level of analyzing an object has become extensive, for example, from the level of distinguishing between a person and a dog, to the level of distinguishing between a male person and a female person, to the level of distinguishing between a young person and an old person, and then to the level of identifying the name of a person according to a definition of object analysis, thus media analysis becoming difficult.

Thus far, research has been concentrated on extraction of objects constituting media and analysis of a feature with only the objects. However, semantics of the objects and the media constituted of the objects may be changed according to relationships between the objects constituting the media. Also, an unclear or obscure feature makes accurate analysis difficult. In this case, like a person collectively using viewed, heard, and known information, by fusing multimodal features related to each other together, it is possible to accurately analyze objects which merely constitute media. Further, since it is expected that extraction of semantics suited for a situation and an analysis in units of screens or scenes will be possible, the fusion of multimodal features is attracting attention. In other words, when a semantic analysis of media is conducted according to objects or media types (a video, text, a photo, a sound, etc.), a semantic analysis suited for a situation is limited, and when a clear analysis is difficult due to noise, etc., an incorrect semantic analysis may be conducted.

Therefore, when all information, such as a sound, a video, an image, text, etc., related to one scene is collectively analyzed, an analysis suited for a situation is possible, and even when noise is included in an object, it is possible to correct the noise to a certain degree using the related information. For such an accurate media analysis, vast basic data (training data) for extracting features of objects or media suited for vocabulary defined in a dictionary is necessary. In other words, accurate analysis may depend on the amount of retained basic data.

However, in the initial stage, it is not possible to have basic data covering all cases. Therefore, when an object or media is in a new form which is not recognizable, it is necessary to consider expanding the range of recognition targets by manually giving a feature to the object or media and adding the object or media to the basic data.

In addition to media analysis, a definition of metadata for expressing content of media is necessary. For the definition of metadata, it is necessary to consider a method of collecting and expressing information, such as a filming place, a date, an owner, a media source, etc., related to the status of media creation or an input as well as a method of expressing content obtained by analyzing the media.

Therefore, when a semantic analysis of each object constituting the media is finished, an operation of analyzing semantics of media content and annotating each media fragment having semantics (S309) is necessary. In this operation, it is necessary to provide a function for extracting semantics of each screen or a whole photo from scenes or a photo based on constitutions of several objects and relationships or actions between the objects and storing and managing the extracted semantics so that a scene or photo suitable for the scenario written by the user may be retrieved.

This process involves a series of processes of an expert semantic analysis of content (defined as an event in the present invention) of media to be used as basic data based on the relationships or actions between the objects, modeling an event resulting from the objects, the actions, and the relationships therebetween based on the analysis results (S313), and constructing an ontology (a semantic dictionary) with the model (S314).

After the ontology is constructed in this way, when the user inputs new media in operation S301, objects are analyzed in operation S303 and operation S304 described above, and while information on the object analysis is received to trace the ontology, semantics of each scene or photo is analyzed through inference (S305).

In practice, it is impossible to model a specific event considering all cases of the event. In other words, while a service is provided, a scene or photo which has not been taken into consideration in the initial stage, and thus is not accurately analyzed, may be input. To efficiently support such a scene or photo, a process of remodeling an event and reconstructing the ontology is necessary when a new relationship is added. However, this process is only handled by an expert having expert knowledge, and is considered to be an obstacle in the proliferation of ontology usage.

Therefore, it is necessary to consider a method of modifying only a part of an ontological structure when a person describes semantics of a new relationship rather than reconstructing the ontological structure from the bottom up to continuously expand the ontological structure. Also, when the relationship between objects is not changed but an analysis level of an object is definitized (e.g., when a person is classified as a male person or a female person or as a young person or an old person, or identified as a specific individual), it is necessary to consider a method for supporting this case. Further, it is necessary to consider a function which separates a specific object or a certain region from a background in an image.

In this way, through the preprocessing process S301 to S314, semantics of newly input media is analyzed, and the media is divided into media fragments, so that the media is prepared to be recyclable by a user.

The postprocessing process provides a function for a user to process the prepared media into a form wanted by the user.

The preprocessing process of the automatic personal media recreation system 200 will be described below with reference to FIG. 4A and FIG. 4B.

First, the automatic personal media recreation system 200 receives a scenario (a storyline) from the outside thereof (S401). Such a scenario is the description of a design of new media made by users who design their desired media to create the new media by recycling pre-created media fragments. A method of describing a scenario is to write the scenario like when a person writes a story or to describe the scenario with particular grammar and rules like when a person writes a program.

When it is possible to write a scenario like when a user writes a story, users may describe things that they want to express without particular considerations or limitations. However, there is a worry about limitations caused by semantic vagueness when the system 200 interprets the description.

On the other hand, when grammar implying particular semantics is created and a scenario is described according to the created grammar, users are required to learn the grammar and may not express everything that they want to express as they like. However, when the system 200 processes the scenario, it is possible to minimize semantic vagueness.

When a scenario is written by a user, the automatic personal media recreation system 200 may provide a scenario editing function to reflect frequent changes or add the user's scenario to one basic scenario (S402).

Also, the automatic personal media recreation system 200 may provide a scenario template (S403) to put an effect, such as an image, text, a sound, and BGM, or an effect, such as a fade-in effect or a fade-out effect, for smoothly connecting two scenes in a particular scene.

The automatic personal media recreation system 200 analyzes the syntax of the input scenario (S404). In order to extract necessary media according to content of the scenario and combine the extracted media in a desired sequence, the automatic personal media recreation system 200 extracts a keyword for retrieval and generates a query (S405). Also, the automatic personal media recreation system 200 generates a replay template (a media fragment combination template) by extracting information necessary for playback, for example, putting various effects, such as a photo, an icon, BGM, etc., in a combined sequence or a particular scene (S406).

To create media according to the scenario written by the user, it is necessary to interpret the scenario and retrieve media suited for the extracted keyword. For retrieving media, the automatic personal media recreation system 200 inquires the query generated using the keyword extracted in operation S405 of a retrieval system (a query handler) (S407), and then receives results of a retrieval according to the query (S408).

A media fragment search provides a function for retrieving media fragments required by a user from media (a personal media storage, metadata indexes, and semantic-based media fragments) which are analyzed in units of scenes and stored. At this time, semantic-based retrieval in which a keyword and an ontology, rather than simple retrieval through keyword matching, is supported, and also retrieval among modalities of various forms is enabled. In other words, it is necessary to consider a function for retrieving everything related to the keyword provided by the user to merely eliminate semantic vagueness and a function for retrieving similar media. To this end, the automatic personal media recreation system 200 may perform a natural language search operation, a similar/related word search operation, and a cross-media search operation based on the query.

Such search operations are performed by retrieving all media fragments related to the keyword, and the automatic personal media recreation system 200 estimates context of media fragments in front of and behind media fragments to be combined among the retrieved media fragments, a preference of the scenario creator, preferences of users who may view new media and are pseudo-interested, etc., and enables the user to select necessary media fragments (S409). Although it is possible to reduce a lot of annoyance of the users by merely retrieving and providing all of the media related to the keyword for extraction of media fragments, this is aimed at increasing the user's convenience and satisfaction. To this end, the automatic personal media recreation system 200 is required to provide a function of selecting media fragments wanted by the user by considering several situations so that the inconvenience of the user picking media fragments wanted by the user out of the retrieved media fragments may be minimized.

In this way, several things may be considered to increase the user's satisfaction with extracted media fragments. For example, an interest of other users who have similar tendencies to a tendency of the user, and the relationship between media to be retrieved and media having a feature similar to a feature of the media to be retrieved may be considered. However, first of all, it is necessary to use a situation that the user intends to use and a pattern frequently used by the user.

To consider a situation in which media will be used, it is necessary to consider previous and subsequent fragments used for media recreation, and such information may be extractable from the previous and subsequent fragments described in the scenario. Also, to analyze preference of the user, basic personal information of the user, information on familiar persons, and also patterns of using a service may be considered.

Because it is not possible to receive all information on the user's preference directly from the user, the automatic personal media recreation system 200 is required to receive the basic personal information of the user (S410), and then implicitly collect and accumulate the information on familiar persons, the patterns of service usage, and so on (S411). At this time, the automatic personal media recreation system 200 may generate and accumulate a situation-based user model, a social relationship model, a media relationship model, and an application domain relationship model using the personal information of the user.

Also, the automatic personal media recreation system 200 may learn individual-specific preference based on the accumulated situation-based user models, social relationship models, media relationship models, application domain relationship models, and so on (S412).

Further, the automatic personal media recreation system 200 may log basic information for analyzing a usage pattern of a service used by the user. For example, while media is output through a media player, the automatic personal media recreation system 200 may collect and manage a media playback pattern of the user through login information of the media player (S413).

Moreover, the automatic personal media recreation system 200 may use a pre-constructed preference prediction algorithm (S414) to grasp a preference of the user and selectively provide media fragments that the user wants among the retrieved media fragments. According to a domain or an environment applied to a utilization of various associated information, an importance of the information may be changed and may also be affected by an applied preference prediction algorithm. Therefore, for a preference analysis, it is necessary to variably apply the importance of the information according to an application time point or environment, and further a method for variably applying an algorithm is necessary. For example, the automatic personal media recreation system 200 may variably perform operations, such as preference prediction based on algorithm fusion, a log-based feedback analysis, and multidimensional cooperation filtering, in operation S409.

When media fragments necessary to constitute the scenario of the user are extracted in operation S409, a function of combining the extracted media fragments into new media is necessary. Specifically, the automatic personal media recreation system 200 is required to dispose and play a list of the media fragments which have been extracted in operation S409 and given priorities in a playback sequence obtained by interpreting the scenario.

To this end, the automatic personal media recreation system 200 first generates a playback plot by combining the extracted list with the combination template (S415). Also, the automatic personal media recreation system 200 manages effects, a download schedule, etc. for causing the generated media playback plot to be naturally and seamlessly played, thereby optimizing the playback plot (S416). In other words, when new media is downloaded and executed in real time, it is necessary to consider disconnections which may occur according to a playback environment, such as a network, etc., for scheduling.

The automatic personal media recreation system 200 transmits the optimized media playback plot to the media player, thereby enabling the user to control playback of the newly created personal media (S417). When the user manipulates the media player to play the newly created personal media, it is possible to output the newly created personal media (S418).

At this time, the automatic personal media recreation system 200 may stream media fragments requested with uniform resource identifiers (URIs) to the media player in real time (S419).

Meanwhile, since only parts (fragments) of different personal media are used, formats of the media fragments may differ from each other. When formats of the media fragments differ from each other and format conversion is required (S420), the automatic personal media recreation system 200 may perform a transcoding function to convert the different formats of the media fragments into the same format (S421). Also, it is possible to edit a function for adjusting the length of actually extracted media when the length differs from a playback time wanted by the user, or various effects for minimizing inconsistency in interfaces between the combined media (S422).

As described above, according to exemplary embodiments of the present invention, various media created by individuals is analyzed and systematically stored in advance, and then necessary parts are extracted and arranged according to a scenario of a user. Therefore, exemplary embodiments of the present invention provide an environment in which anyone may easily create new media, and a structure in which it is possible to use new algorithms or modules or develop a third party application service.

Also, in an existing media analysis method, an analysis of video content uses only a single modality, for example, a voice, a video, etc., and thus has limitations resulting from noise or indistinctness between patterns, but according to exemplary embodiments of the present invention, a voice, a video, text, etc. can be collectively used like when a person analyzes media, and thus it is possible to minimize influence of noise or indistinct pattern information by fusing relationships and features of various modalities.

Further, in the case of retrieving a desired scene, a keyword search used in an existing preference prediction method is limited by semantic vagueness between keywords and a range covered by the keyword, but exemplary embodiments of the present invention provide an intelligent search method supporting a synonym search and a cross-search in which different modalities are used, such as retrieving a necessary voice with a video or retrieving a necessary video with a sound through semantic-based indexing and an expansion of search words. In addition, while the existing preference prediction method is based on a correlation between media and social relationships between persons and is limited to static and uniform algorithm applications, etc., according to exemplary embodiments of the present invention, a preference may be predicted by dynamically applying a suitable algorithm according to each individual or fusing results of a plurality of algorithms.

Moreover, exemplary embodiments of the present invention propose a method of describing a storyline to enable a user to create new video, a method of describing content necessary to retrieve a captured video, a method of editing, combining, and playing selected media fragments, and a method of eliminating artificiality which may be caused by combining selected scenes, so that existing methods which are manually performed can be automatically processed.

According to exemplary embodiments of the present invention, various personal media, which are captured or created by individuals and are only consumed, such as by mere sharing, and thus have limited value creation, are divided into the smallest units having semantics and stored, and only a part required for media by a user is made recyclable, so that personal media are caused to advance as information goods with which it is possible to create infinite value. In particular, anyone having a novel idea may upgrade the video service industry centered on producers, providers, and experts into a video knowledge creation service industry capable of creating value from video, and thereby establish a foundation for implementing a creative economy centered on individuals through imagination development.

Also, exemplary embodiments of the present invention may be used in a system which creates new media using stored personal media, and may also be applied to an intelligent search service supporting video analysis in which information obtained by analyzing content of a video is used and a cross-media search service for retrieving text, a sound, a video, etc. with a sound or an image rather than a keyword for tracking.

Further, exemplary embodiments of the present invention may be applied to a curation service or an individual preference analysis service for extracting personalized information or knowledge from vast information and providing the extracted information or knowledge, a social network service/robot journal service for generating video from text and providing the video, and so on.

Figure 5:
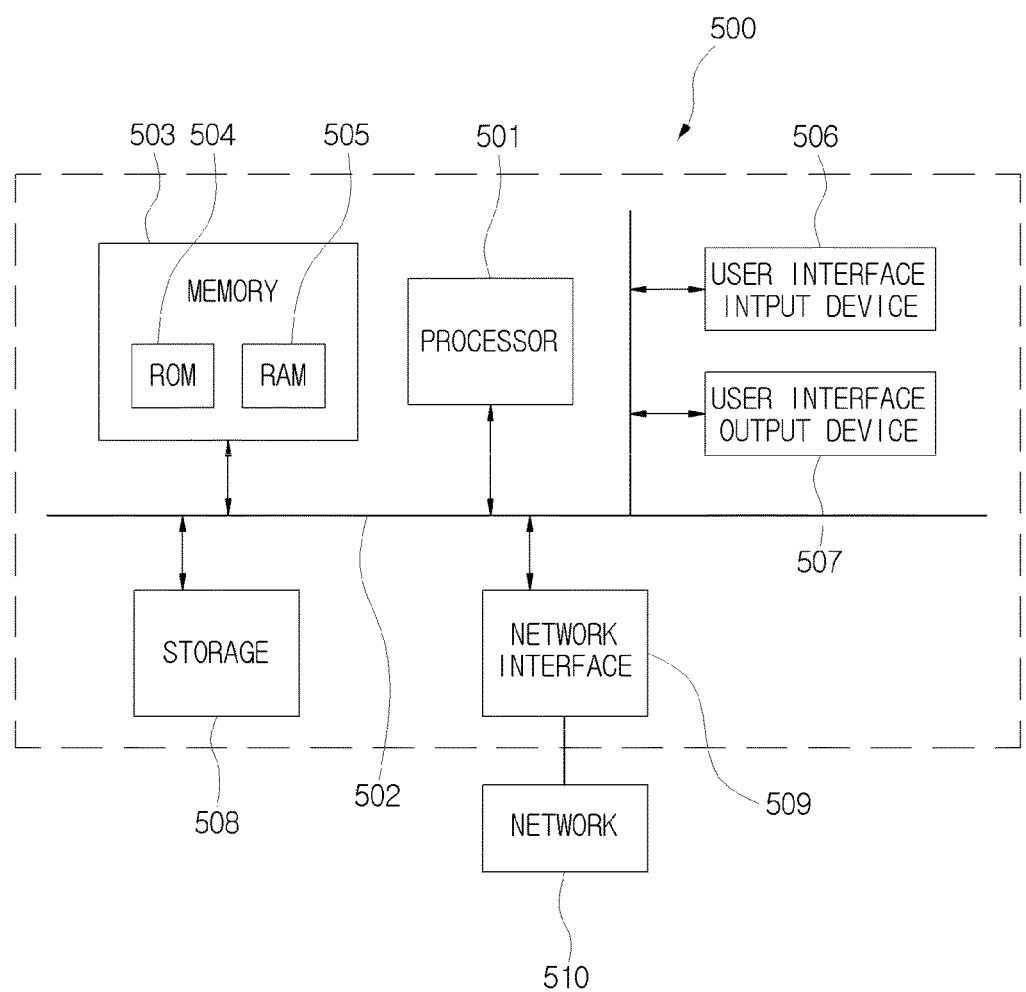
FIG. 5 is a block diagram illustrating a computer system for the present invention.

An embodiment of the present invention may be implemented in a computer system, e.g., as a computer readable medium. As shown in in FIG. 5, a computer system 500 may include one or more of a processor 501, a memory 503, a user input device 506, a user output device 507, and a storage 508, each of which communicates through a bus 502. The computer system 500 may also include a network interface 509 that is coupled to a network 510. The processor 501 may be a central processing unit (CPU) or a semiconductor device that executes processing instructions stored in the memory 503 and/or the storage 508. The memory 503 and the storage 508 may include various forms of volatile or non-volatile storage media. For example, the memory may include a read-only memory (ROM) 504 and a random access memory (RAM) 505.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for automatically recreating personal media through fusion of multimodal features, the system comprising:
   one or more processors that process computer executable program code embodied in non-transitory computer readable storage media, the computer executable program code comprising:
   multimodal fusion analyzer program code that analyzes semantics of personal media having various forms based on a plurality of modalities, and divides the personal media into media fragments which are smallest units having semantics;
   semantic-based intelligent retriever program code that stores and retrieves the divided media fragments by considering the semantics;
   personal media recommender program code that learns and analyzes a profile of a user through modeling the user, and selects and recommends a plurality of media fragments wanted by the user among the media fragments retrieved by the semantic-based intelligent retriever; and
   personal media creator program code that creates new personal media using the plurality of media fragments recommended by the personal media recommender according to a scenario input by the user,
   wherein the personal media recommender program code further comprises program code that generates a preference model by considering relational features of media, a situation, space and time, an individual, and social network service and that performs media preference learning by multidimensionally analyzing multiple association rules and association intensities through an analysis of correlations between preferences based on the generated preference model.

2. The system of claim 1, wherein the multimodal fusion analyzer program code separates at least one modality among a voice, a sound, text, and a video image from the personal media and analyzes a feature.

3. The system of claim 2, wherein the multimodal fusion analyzer program code detects a dividable object and action based on a correlation between the separated modality and a modality of previously learned training data, and divides the dividable object and action into the media fragments which are physical units.

4. The system of claim 3, wherein, for efficient management of the media fragments, the semantic-based intelligent retriever program code generates metadata indexes by considering the semantics of the divided media fragments and stores the generated metadata indexes based on the semantics.

5. The system of claim 4, wherein the semantic-based intelligent retriever program code interprets the scenario to extract a keyword for retrieval and generate a query, and expands a retrieval range using at least one of the keyword, an associated keyword related to the keyword, and associated media related to the keyword to intelligently retrieve media fragments for the scenario.

6. The system of claim 5, wherein the personal media recommender program code selects some of the retrieved media fragments based on the preference model.

7. The system of claim 6, wherein the personal media creator program code interprets the scenario to make a sequence for playback, and disposes and plays the selected media fragments.

8. The system of claim 7, wherein the personal media creator program code converts formats of the selected media fragments into an identical format when the formats of the selected media fragments are not identical.

9. The system of claim 8, wherein the personal media creator program code performs an optimization operation of adjusting a playback time length of the new personal media according to a playback time length wanted by the user, or an optimization operation of adjusting artificiality caused at interfaces between the selected media fragments for natural and seamless playback.

10. A method of automatically recreating personal media through fusion of multimodal features, the method comprising:
- processing computer executable program code embodied in non-transitory computer readable storage media by one or more processors, the computer executable program code comprising:
- program code that analyzes semantics of personal media having various forms based on a plurality of modalities, and divides the personal media into media fragments which are smallest units having semantics;
- program code that stores and retrieves the divided media fragments by considering the semantics;
- program code that learns and analyzes a profile of a user through modeling the user, and selects and recommends a plurality of media fragments wanted by the user among the retrieved media fragments; and
- program code that creates new personal media using the plurality of recommended media fragments according to a scenario input by the user,
- wherein the program code that learns and analyzes a profile of a user through modeling the user further comprises program code that generates a preference model by considering relational features of media, a situation, space and time, an individual, and social network service and that performs media preference learning by multidimensionally analyzing multiple association rules and association intensities through an analysis of correlations between preferences based on the generated preference model.

11. The method of claim 10, wherein the program code that divides the personal media includes program code that separates at least one modality among a voice, a sound, text, and a video image from the personal media and analyzing a feature.

12. The method of claim 11, wherein the program code that divides the personal media includes program code that detects a dividable object and action based on a correlation between the separated modality and a modality of previously learned training data, and divides the dividable object and action into the media fragments which are physical units.

13. The method of claim 12, wherein, for efficient management of the media fragments, the program code that retrieves the divided media fragments includes program code that generates metadata indexes by considering the semantics of the divided media fragments and stores the generated metadata indexes based on the semantics.

14. The method of claim 13, wherein the program code that retrieves the divided media fragments includes program code that interprets the scenario to extract a keyword for retrieval and generate a query, and expands a retrieval range using at least one of the keyword, an associated keyword related to the keyword, and associated media related to the keyword to intelligently retrieve media fragments for the scenario.

15. The method of claim 14, wherein the program code that selects and recommends the plurality of media fragments includes program code that selects some of the retrieved media fragments based on the preference model.

16. The method of claim 15, wherein the program code that creates the new personal media includes program code that interprets the scenario to make a sequence for playback, and disposes and plays the selected media fragments.

17. The method of claim 16, wherein the program code that creates the new personal media includes program code that converts formats of the selected media fragments into an identical format when the formats of the selected media fragments are not identical.

18. The method of claim 17, wherein the program code that creates the new personal media includes program code that performs an optimization operation of adjusting a playback time length of the new personal media according to a playback time length wanted by the user, or an optimization operation of adjusting artificiality caused at interfaces between the selected media fragments for natural and seamless playback.

* * * * *